US008449791B2

(12) United States Patent
Kim et al.

(10) Patent No.: US 8,449,791 B2
(45) Date of Patent: May 28, 2013

(54) GRAPHENE COMPOSITION HAVING LIQUID CRYSTALLINE PROPERTIES AND PREPARATION METHOD THEREOF

(75) Inventors: Sang Ouk Kim, Daejeon (KR); Ji Eun Kim, Daejeon (KR); Tae Hee Han, Daejeon (KR); Sun Hwa Lee, Daejeon (KR); Ju Young Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 266 days.

(21) Appl. No.: 12/976,930

(22) Filed: Dec. 22, 2010

(65) Prior Publication Data
US 2011/0233452 A1    Sep. 29, 2011

(30) Foreign Application Priority Data

Mar. 8, 2010    (KR) .................. 10-2010-0020308

(51) Int. Cl.
| C09K 19/52 | (2006.01) |
| C09K 19/38 | (2006.01) |
| C09K 19/54 | (2006.01) |
| H01B 1/04 | (2006.01) |
| H01B 1/24 | (2006.01) |
| C01B 31/04 | (2006.01) |

(52) U.S. Cl.
USPC ............... 252/299.01; 252/299.5; 252/502; 252/510; 977/734; 977/742; 423/448

(58) Field of Classification Search
USPC .......... 252/299.01, 299.5, 502, 510; 977/734, 977/742; 423/448
See application file for complete search history.

(56) References Cited

FOREIGN PATENT DOCUMENTS

| JP | 3265719 | 9/1994 |
| KR | 10-0663716 | 12/2006 |
| KR | 10-0829513 | 5/2008 |

OTHER PUBLICATIONS

Hill et al. "Self-Assembled Hexa-peri-hexabenzocoronene Nanotube", Science, vol. 304(5676), pp. 1481-1483, 2004.*
Zhang et al. "Carbon Nanotubes as Liquid Crystals", Small Journal, pp. 1270-1283, 2008, vol. 4, No. 9.
Song et al. "Nematic Liquid Crystallinity of Multiwall carbon Nanotubes", Science, 2003, p. 1363, vol. 302.
English language abstract of JP 3265719.
English language abstract of KR 10-0829513.
English language abstract of KR 10-0663716.

* cited by examiner

Primary Examiner — Shean C Wu
(74) Attorney, Agent, or Firm — Rabin & Berdo, P.C.

(57) ABSTRACT

The present invention relates to a graphene composition having liquid crystalline properties and a preparation method thereof, and more particularly to a graphene composition wherein graphene having useful electrical properties is uniformly dispersed in a medium, whereby it is chemically and physically stable, exhibits a liquid crystal phase in a wide temperature range and has good compatibility with other compounds, and to a preparation method thereof. In the graphene composition, liquid crystalline properties are imparted to graphene, which can be produced in large amounts and has excellent mechanical, chemical and electrical properties, and thus the graphene composition can provide a chance to apply functional carbon materials in various fields, including nanocomposites, energy storage materials, and photonics.

16 Claims, 5 Drawing Sheets

GRAPHENE COMPOSITION HAVING LIQUID CRYSTALLINE PROPERTIES AND PREPARATION METHOD THEREOF

CROSS-REFERENCE TO RELATED APPLICATIONS

This application claims the benefit under 35 USC 119 to Korean Patent Application No. 10-2010-0020308, filed on Mar. 8, 2010, which is incorporated herein by reference in its entirety.

BACKGROUND OF THE INVENTION (a) Field of the Invention

The present invention relates to a graphene composition having liquid crystalline properties and a preparation method thereof, and more particularly to a graphene composition wherein graphene having useful electrical properties is uniformly dispersed in a medium, whereby it is chemically and physically stable, exhibits a liquid crystal phase in a wide temperature range and has good compatibility with other compounds, and to a preparation method thereof.

(b) Background of the Related Art

Graphene is a single layer of sp2 hybrid carbon atoms covalently bonded with hexagonal arrangement, and is the basic building block for carbon nanotubes (CNTs), buckyballs, and graphite. Before it was found that graphene exists as a single layer, graphene was demonstrated to have half-integer quantum hall effects at room temperature, and high mechanical properties, and thus it has attention as a novel element.

The most noticeable property is that electrons flow in graphene as if they are weightless, which means that electrons flow at the velocity of light in vacuum. Another property of graphene is that it has an unusual half-integer quantum hall effect for electrons and holes.

The electron mobility of graphene known so far is from about 20,000 to 50,000 cm/Vs. Also, it is advantageous to use graphene since products made from graphene are inexpensive while products made from carbon nanotubes which are similar affiliations to graphene are expensive due to low yields obtained during synthesis and purification processes even though the carbon nanotubes are inexpensive themselves. In case of single wall carbon nanotubes, they exhibit different metallic and semiconducting characteristics according to their chirality and diameter. Furthermore, single wall carbon nanotubes having identical semiconducting characteristics have different energy band gaps depending on their chirality and diameter. Thus, single wall carbon nanotubes must be separated from each other in order to obtain desired semiconducting or metallic characteristics. However, it is known to be very difficult to separate single wall carbon nanotubes from each other.

On the other hand, it is advantageous to use graphene that a device can be easily designed to exhibit desired electrical characteristics by arranging the crystalline orientation in a desired direction since electrical characteristics of graphene are changed according to the crystalline orientation. The characteristics of the graphene can be efficiently applied to carbonaceous electrical devices or carbonaceous electromagnetic devices.

Meanwhile, liquid crystals possess both the fluidity of liquid and the anisotropic properties of solids and liquid crystal phase is a mesophase between solid crystals having positional order and orientational order and liquid having molecular arranged in a disordered state. Liquid crystals have orientational order while exhibiting fluidity like liquid.

A liquid crystal molecule is referred to as "mesogen" and the mesogen exhibits properties including optical anisotropy and dielectric anisotropy. Due to the dielectric anisotropy or shape of the mesogen, liquid crystals are readily arranged by an external field. When the mesogens are aligned in one direction by applying an external field, the anisotropy of each of the mesogens macroscopically appears, and the direction of polarized light is changed or the mechanical properties of the mesogens are changed.

Due to such properties, in many cases, liquid crystals are used to impart anisotropic properties to materials or to impart liquid crystalline properties to materials in order to control the orientation using an external field.

Typical examples thereof are liquid crystal displays (LCDs) and fibers. In the case of LCDs, the passage of light from a backlight unit can be controlled by changing the orientation of mesogens using an electric field. In the case of fibers, because the mechanical properties in the axial direction should be much higher than the mechanical properties in other directions, materials having liquid crystalline properties themselves can be made into fibers or made into composites with filler, thus improving the physical properties of the materials.

Accordingly, imparting liquid crystal properties to a material means that the orientation of the material can be easily controlled and materials having different mechanical, optical and electrical properties according to the orientation can also be made. Thus, imparting liquid crystal properties is important in terms of processes.

In order to impart liquid crystal properties to materials or improve the physical properties of liquid crystalline properties as described above, studies on the liquid crystalline properties of carbon nanotubes have been conducted (Shanju Zhang, Satish Kumar, *Small Journal*, 4:9, 1270~4283, 2008), and studies on the nematic liquid crystalline properties of multi-wall carbon nanotubes have been conducted (Song, W., Kinloch I. A., Windle, A. H., *Science,* 302, 1363, 2003).

In addition, Korean Patent Registration No. 0663716 discloses a method of uniformly dispersing carbon nanotubes in a liquid crystalline material, and Korean Patent Registration No. 0829513 discloses a carbon nanotube-enhanced thermotropic liquid crystal polymer nanocomposite obtained by adding carbon nanotubes to a thermotropic liquid crystal polyester copolymer resin, and a preparation method thereof.

However, the above-described prior documents employ carbon nanotubes which show very low yields when purified after synthesis, exhibit different metallic and semiconducting characteristics according to their chirality and diameter, different energy band gaps, and must be separated from each other in order to obtain desired semiconducting or metallic characteristics. Particularly, Korean Patent Registration Nos. 0663716 and 0829513 merely improve the physical properties of liquid crystalline materials by dispersing carbon nanotubes in the liquid crystalline materials, and thus the use of the liquid crystal materials as carbon materials in various fields is limited.

Meanwhile, Japanese Patent Registration No. 3265719 discloses a liquid crystalline resin composition containing graphite in a liquid crystalline polyester and/or polyester amide forming an anisotropic melt phase.

However, Japanese Patent Registration No. 3265719 merely improves the physical properties of the liquid crystalline material by dispersing graphite in the liquid crystalline material, and thus the use of the liquid crystalline material to provide liquid crystalline properties in various fields is limited.

Accordingly, the present inventors have made many efforts to solve the above-described problems occurring in the art and, as a result, have found that, when graphene having useful electrical properties are uniformly dispersed in a medium, a liquid crystalline graphene composition is prepared which is chemically and physically stable, exhibits a liquid crystal phase in a wide temperature range and has good compatibility with electromagnetic materials, polymers and the like, thereby completing the present invention.

SUMMARY OF THE INVENTION

It is an object of the present invention to provide a liquid crystalline graphene composition which is chemically and physically stable, exhibits a liquid crystal phase in a wide temperature range and has good compatibility with other compounds, and a preparation method thereof.

Another object of the present invention is to provide a liquid crystal nanocomposite comprising an electromagnetic material in said graphene composition having liquid crystalline properties.

Still another object of the present invention is to provide a liquid crystal polymer nanocomposite comprising a polymer in said graphene composition having liquid crystalline properties.

To achieve the above objects, the present invention provides a graphene composition having liquid crystalline properties, which comprises 0.05 to 20 parts by weight of graphene based on 100 parts by weight of a medium, and a preparation method thereof.

The present invention also provides a liquid crystal nanocomposite comprising an electromagnetic material in said graphene composition having liquid crystalline properties.

The present invention also provides a liquid crystal polymer nanocomposite comprising a polymer in said graphene composition having liquid crystalline properties.

Other features and embodiments of the present invention will be more apparent from the following detailed descriptions and the appended claims.

DETAILED DESCRIPTION OF THE PREFERRED EMBODIMENT

Unless defined otherwise, all technical and scientific terms used herein have the same meaning as commonly understood by one of ordinary skill in the art to which the invention pertains. Generally, the nomenclature used herein and the experiment methods described below are those well known and are employed commonly in the art.

In one aspect, the present invention provides a graphene composition having liquid crystalline properties, which comprises 0.001 to 20 parts by weight of graphene based on 100 parts by weight of a medium.

More specifically, the graphene composition having liquid crystalline properties is prepared by uniformly dispersing a graphene in a medium wherein the graphene composition having liquid crystalline properties comprises, based on 100 parts by weight of the medium, 0.001-20 parts by weight of graphene.

Examples of graphene which can be used in the present invention include graphite consisting of a stack of graphene, single-layer graphene, multilayer graphene, graphene oxides, single-layer or multilayer graphene or graphite oxidation product such as graphite oxide, graphene fluoride, graphene having a functional group such as a sulfone group ($SO_3H$), functionalized graphite or a reduction product thereof, synthesized graphene or graphite, two-dimensional carbon allotropes of graphene or graphite such as graphene exfoliated from expanded graphite, single-molecular, small-molecular or polymeric graphene or graphite such as didodecyldimethylammoniumbromide graphene, phenylisocyanate graphite oxide or alkylamine graphene, and graphene or graphite functionalized with particles such as silver (Au), platinum (Pt) or palladium (Pd).

Graphene which can be used in the present invention has an aspect ratio (D/L) of 30 or more, and preferably 30-500,000. If the aspect ratio (D/L) of graphene is less than 30, the critical concentration for exhibiting liquid crystalline properties will be excessively increased to make it difficult to disperse the graphene, thus increasing the process cost, and if the aspect ratio (D/L) of graphene is more than 500,000, it will be difficult to disperse the graphene in a medium, thus increasing the cost for dispersion and purification.

In the present invention, the medium is used to disperse graphene into a liquid crystal phase and includes any flowable material such as a flowable solid, powder, polymer, semi-solid or liquid, and preferably, the medium may be selected from a group consisting of water, dimethylformamide (DMF), N-methyl-2-pyrrolidone, ethylene glycol, tetrahydrofuran, isopropanol, dimethylformamide, chloroform, dichloroethane, ethylene dichloride, toluene, n-pentane, acetone, dioxane, ethyl acetate, dimethyl sulfoxide, acetonitrile, pyridine, ethanol, methanol, acetic acid, methylisobutylketone, methylenechloride, n-hexane, isooctane, cyclohexane, cyclopentane, carbon disulfide, carbon tetrachloride, o-xylene, diethyl ether, benzene, polyacrylic acid (PAA), polyethyleneoxide (PEO), polystyrene, polymethylmethacrylate, polycarbonate, polyethylene, polypropylene, polyacrylonitrile, polyvinylpyrrolidone, polydimethylsiloxane, poly(styrene-block-ethyleneoxide), poly(styrene-block-dimethylsiloxane), poly(styrene-block-methylmethacrylate), deoxyribonucleic acid (DNA), lipid, peptide, poly(acetylene)s, poly(pyrrole)s, poly(thiophene)s, polyanilines, polythiophenes, poly(p-phenylenesulfide), poly(p-phenylenevinylene)s, liquid-crystal polymers, metals that melt at room temperature or high temperature such as mercury or gallium, flowable powdery solids, and mixtures thereof.

Additionally, in the present invention, the graphene composition having liquid crystalline properties comprises, based on 100 parts by weight of a medium, 0.001-20 parts by weight of graphene. If graphene is dispersed in the medium in an amount of less than 0.001 parts by weight based on 100 parts by weight of the medium, liquid crystalline properties cannot be imparted to graphene, and if graphene is dispersed in the medium in an amount of more than 20 parts by weight based on 100 parts by weight of the medium, it will be difficult to uniformly disperse graphene in the medium, the resulting composition can be gelled or the production of the composition can be increased.

The graphene composition having liquid crystalline properties according to the present invention combines the advantages of both graphene and liquid crystals, and the orientation of graphene can be controlled using an external field such as a magnetic field or a flow field, which are the inherent characteristics of liquid crystals. The graphene composition of the present invention can macroscopically exhibit anisotropic optical, dielectric and mechanical properties, and thus it can be used in a wide range of applications and makes it possible to establish new processes. In addition, in the graphene composition, liquid crystalline properties are imparted to graphene, which can be produced in large amounts and has excellent mechanical, chemical and electrical properties, and thus the graphene composition of the present invention can provide a chance to apply functional carbon materials in various fields, including nanocomposites, energy storage materials, and photonics.

In another aspect, the present invention relates to a method for preparing a graphene composition having liquid crystalline properties, the method comprising dispersing 0.001-20 parts by weight of graphene in 100 parts by weight of a medium.

In the present invention, graphene can be uniformly and stably dispersed in the medium by sonication, mechanical stirring and a combination thereof.

In addition, in the present invention, impurities contained in the liquid crystalline composition comprising graphene dispersed in the medium can be removed by dialysis or centrifugation.

According to the method for preparing the graphene composition having liquid crystalline properties in the present invention, liquid crystalline properties can be imparted to graphene in an inexpensive, simple and easy manner, and thus the graphene composition having liquid crystalline properties can be used in a wide range of applications.

In still another aspect, the present invention relates to a liquid crystal nanocomposite comprising an electromagnetic material in said graphene composition having liquid crystalline properties.

In the present invention, the liquid crystal nanocomposite comprises the electromagnetic material in an amount of 0.001-95 parts by weight based on 100 parts by weight of the graphene composition having liquid crystalline properties. If the electromagnetic material is comprised in an amount of less than 0.001 parts by weight based on 100 parts by weight of the graphene composition having liquid crystalline properties, the effect of increasing the degree of orientation for an external magnetic will be insignificant, and if the electromagnetic material is comprised in an amount of more than 95 parts by weight, it will be difficult to stably disperse the electromagnetic material in the medium.

In the present invention, the electromagnetic material is used to increase the degree of orientation of the graphene composition having liquid crystalline properties and is a ferromagnetic, paramagnetic or dielectric material. As the electromagnetic material, any conductive or magnetic material can be used in the present invention, as long as it increases the degree of orientation of graphene for an external electromagnetic field. Preferably, the electromagnetic material may be selected from a group consisting of titanium (Ti), molybdenum (Mo), gold (Au), aluminum (Al), calcium (Ca), cadmium (Cd), iron (Fe), nickel (Ni), platinum (Pt), zinc (Zn), copper (Cu), and mixtures thereof.

In the present invention, the liquid crystal nanocomposite is a mixture of the electromagnetic material with the graphene composition having liquid crystalline properties and can be prepared by the ion-ion interaction or $\pi$-$\pi$ interaction between the electromagnetic material and the graphene comprised in the graphene composition having liquid crystalline properties.

In the present invention, the liquid crystal nanocomposite may additionally comprise a coupling agent for improving the ability to couple the electromagnetic material with the graphene comprised in the graphene composition having liquid crystalline properties. The coupling agent may be comprised in an amount of 0.1-20 parts by weight based on 100 parts by weight of the liquid crystal nanocomposite. If the coupling agent is added in an amount of less than 0.1 parts by weight based on 100 parts by weight of the liquid crystal nanocomposite, the effect of adding the coupling agent cannot be obtained, and if it is added in an amount of more than 20 parts by weight, it will reduce the purities of the materials, such that a separate process for removing the coupling agent will be required.

In the present invention, the coupling agent is one or more selected from a group consisting of 1,3-dicyclohexylcarbodiimide, 1-ethyl-3(3-dimethylaminopropyl)-carbodiimide, benzotriazol-1-yloxytris(dimethylamino)phosphonium hexafluorophosphate and O-(7-azabenzotriazol-1-yl)-N,N,N',N'-tetramethyluronium hexafluorophosphate. Preferably, the coupling agent is selected from the group consisting of O-(7-azabenzotriazol-1-yl)-N,N,N',N'-tetramethyluronium hexafluorophosphate, and mixtures thereof.

In another aspect, the present invention relates to a liquid crystal polymer nanocomposite comprising a polymer in the graphene composition having liquid crystalline properties.

In the preset invention, the liquid crystal polymer nanocomposite comprises the polymer in an amount of 10-95 parts by weight based on 100 parts by weight of the the graphene composition having liquid crystalline properties. If the polymer is comprised in an amount of less than 10 parts by weight based on 100 parts by weight of the graphene composition having liquid crystalline properties, it will be difficult to maintain the orientation of graphene molecules, even if the graphene molecules are oriented by the shear force of the polymer, and if it is added in an amount of more than 95 parts by weight, it will be difficult to disperse the polymer.

In the present invention, any polymer may be used, as long as it is easily dispersed in the medium. The polymer may be selected from a group consisting of polyacrylic acid (PAA), polyethyleneoxide (PEO), polystyrene, polymethylmethacrylate, polycarbonate, polyethylene, polypropylene, polyacrylonitrile, polyvinylpyrrolidone, polydimethylsiloxane, poly(styrene-block-ethyleneoxide), poly(styrene-block-dimethylsiloxane), poly(styrene-block-methylmethacrylate), deoxyribonucleic acid (DNA), lipid, peptide, poly(acetylene)s, poly(pyrrole)s, poly(thiophene)s, polyanilines, polythiophenes, poly(p-phenylenesulfide), poly(p-phenylenevinylene)s, liquid-crystal polymers, and mixtures thereof. Preferably, it is selected from a group consisting of polyacrylic acid, polyacrylonitrile, ploystyrene, polyethyleneoxide, polymethylmethacrylate, and mixtures thereof.

In the present invention, the electromagnetic material or the polymer can be uniformly and stably dispersed in the medium by sonication, mechanical stirring and a combination thereof.

The liquid crystal nanocomposite or the liquid crystal polymer nanocomposite of the present invention comprises the electromagnetic material or the polymer in the graphene composition having liquid crystalline properties, wherein the electromagnetic material or polymer comprised in the compositions improves the physical properties of the graphene composition having liquid crystalline properties. Accordingly, the electromagnetic material or polymer comprised in the compositions of the present invention has the effect of increasing the response rate and recovery rate for an applied electromagnetic field or inducing orientation by shear force, and thus the compositions of the present invention can be used in a wide range of fields.

EXAMPLES

Hereinafter, the present invention will be described in further detail with reference to the following examples. It is to be understood, however, that these examples are for illustrative purposes only and are not to be construed to limit the scope of the present invention.

Example 1

Preparation of Graphene Oxide Composition Having Liquid Crystalline properties 1-1: Preparation of Grephene Oxide 1 g of graphite and 3.5 g of potassium permanganate were added to 40 ml of sulfuric acid and stirred at 35° C. 100 ml of distilled water was added slowly to the mixture in such a manner that the temperature of the solution did not increase. Then, 100 ml of hydrogen peroxide was added slowly thereto until bubbles appeared. In this Example, three types of graphite (A, B and C) shown in Table 1 below were used. The graphite-comprising mixtures were filtered through a glass funnel, thus preparing graphene oxides.

The graphene oxides thus prepared were observed using Atomic Force Microscopy (SPA400) and, as a result, it could be seen that, in all the cases of A, B and C, single graphene oxides having a particle size of about ~1.7 nm were prepared.

Also, the diameters of the prepared graphene oxides were measured using an image analysis program named Matrox. The area of the graphene oxide prepared from each of the graphite sources was measured using the image analysis program, and on the assumption that the graphite oxide would be circular in shape, the diameters of about 1000 samples per each of the graphene oxides A, B and C were measured.

As can be seen in Table 1, the measurement results indicated that the average diameters of the graphene oxides A, B and C were 1.65 μm, 1.22 μm and 0.75 μm, respectively, and the standard deviations were 1.28, 1.16 and 0.88, respectively, very close to 1. Herein, the standard deviation determines the range of a biphase in which two phases coexist in a liquid crystal state, and this range is proportional to square of the standard deviation. Thus, in the case of the compositions having a very high polydispersity with a standard deviation of about 1, it was shown that, even when the standard deviation slightly changed around 1, the range of the biphase did not substantially change.

TABLE 1

| | section | | |
|---|---|---|---|
| | A | B | C |
| Manufacturer | Sigma Aldrich (graphite flake) | Graphit Kropfmuhl (natural graphite) | Bay Carbon (SPI) |
| the average diameters of the graphene oxides | 1.65 B μm | 1.22 μm | 0.75 μm |
| The standard deviation of diameters of the graphene oxides | 1.28 | 1.16 | 0.88 |
| The average aspect ratio of the graphene oxides | ~1100 | ~800 | ~500 |

1-2: Preparation of Graphene Oxide Composition

Figure 1:
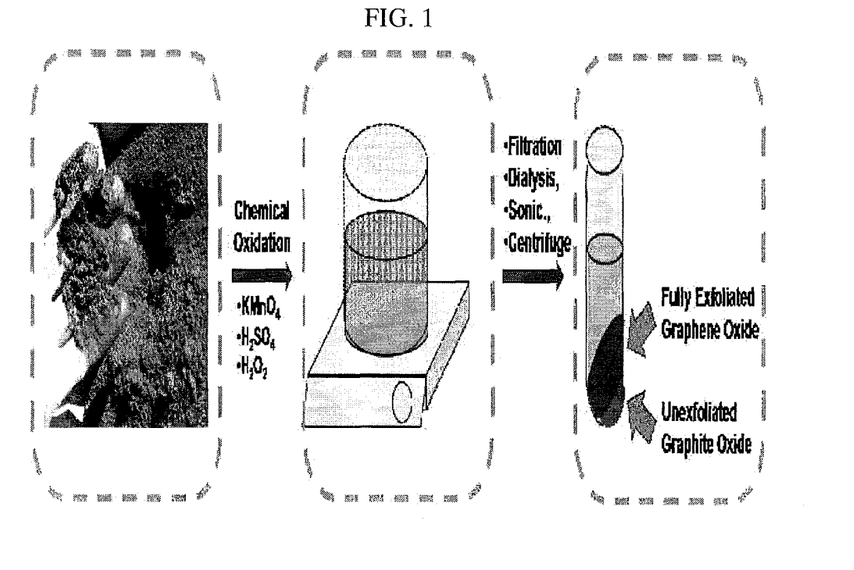
FIG. 1 is a schematic diagram showing a method for preparing a graphene oxide composition having liquid crystalline properties according to the present invention.

The graphene oxide prepared in Example 1-1 was washed three times by dispersing it in 1 M HCl aqueous solution and then filtering the dispersion through a microfilter. The solid remaining after the filtration was dispersed in distilled water to a concentration of 4 wt %, and then $K^+$, $Mn^{2+}$, $H^+$, $SO_4^{2-}$, $Cl^-$ and the like remaining in the dispersion were dialyzed using a dialysis membrane for 1 week. After the dialysis, the mixture in the dialysis membrane was dispersed by sonication for 30 minutes, and then centrifuged to remove the precipitate attached on the bottom, thereby preparing a graphene oxide composition having liquid crystalline properties (FIG. 1).

Example 2

Preparation of Liquid Crystal Nanocomposite Material

Figure 2:
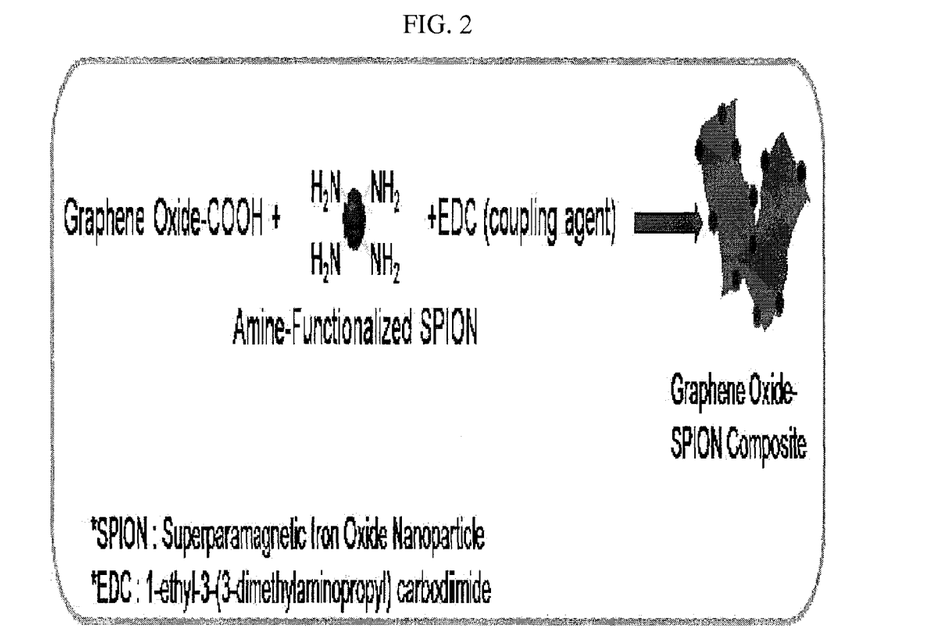
FIG. 2 is a schematic diagram showing a method of coupling an electromagnetic material to a graphene oxide composition having liquid crystalline properties according to the present invention.

A dispersion of 1 mg/ml of amine-terminated iron oxide nanoparticles in distilled water was added to 5 wt % of the graphene oxide composition prepared in Example 1-2. Then, in order to couple the amine-terminated iron oxide nanoparticles to the graphene oxide, 1 mg of 1-ethyl-3-(3-dimethylaminopropyl) carbodiimide (EDC) as a coupling agent was added to the mixture and stirred for 24 hours, thereby preparing a graphene oxide nanocomposite material having liquid crystalline properties (FIG. 2).

Example 3

Preparation of Liquid Crystal Polymer Nanocomposite Material 5 g of poly(acrylicacid) (Mv: 450,000, Tg: 106.0° C.) was added to 0.5 wt % of the graphene oxide composition prepared in Example 1-2, and then stirred at 45° C. for one day, thereby preparing a graphene oxide nanocomposite material having liquid crystalline properties.

Test Example 1

Measurement of Liquid Crystalline Property of Graphene Oxide Composition

Figure 3:
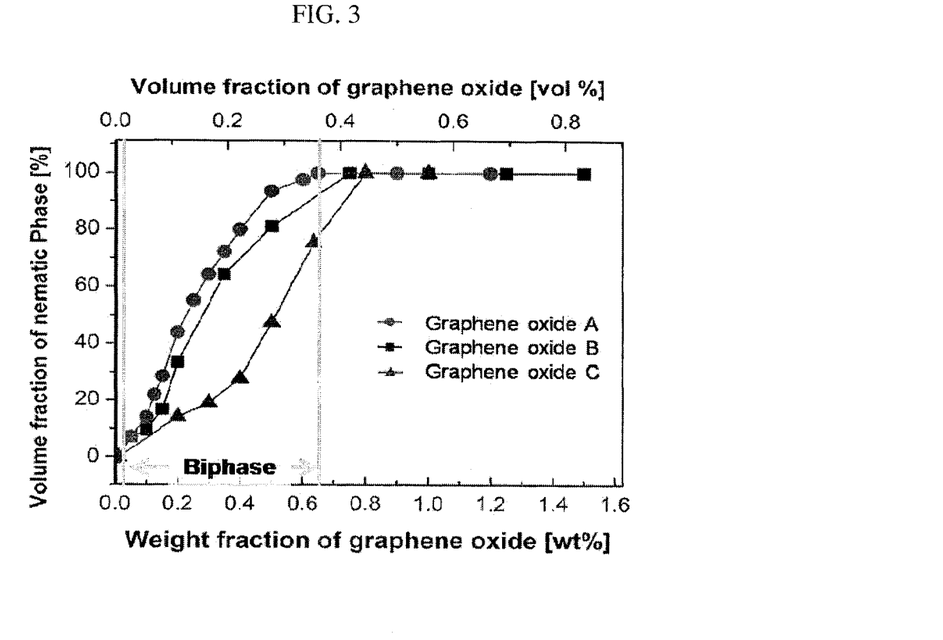
FIG. 3 is a graphic diagram showing the volume fraction of a nematic phase as a function of the concentration of a graphene oxide composition having liquid crystalline properties according to the present invention.

The graphene oxide composition having a graphene oxide concentration of 0.001-7 wt %, prepared in Example 1-2, was allowed to stand for about 1 month, so that it was phase-separated. As a result, a visibly precipitated phase started to occur from a graphene oxide concentration of about 0.05 wt %, and the volume fraction of the precipitated phase increased as the graphene oxide concentration increased, and finally, at a graphene oxide concentration of 0.65-0.8 wt %, a single phase appeared (FIG. 3).

The graphene oxide composition in the biphase region was interposed between two perpendicularly crossed polarizers, and light was passed therethrough. As a result, the lower settled phase passed light to appear bright, and the upper unsettled phase did not pass light, suggesting that the graphene oxide composition had liquid crystalline properties (FIG. 4).

Figure 4:
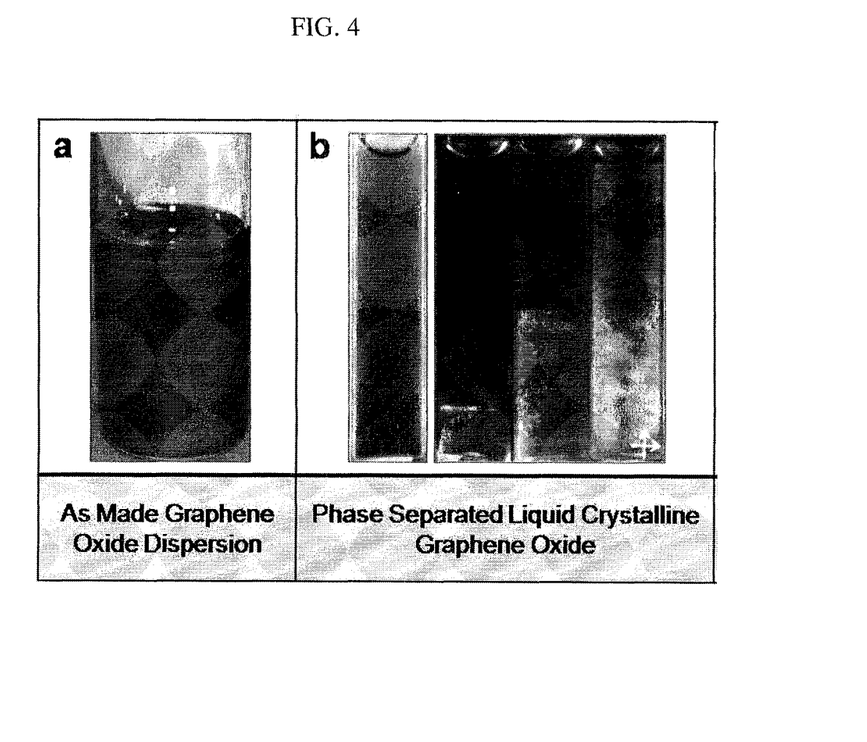
FIG. 4 shows polarized micrograph of a graphene oxide composition having liquid crystalline properties according to the present invention ((a): polarized micrograph of phase-separated graphene oxide composition prepared using 0.5 wt % graphite flake (Sigma Aldrich), and (b): polarized micrograph of phase-separated graphene oxide composition prepared using graphite flake (Sigma Aldrich) at concentrations of 0.2 wt %, 0.05 wt %, 0.2 wt and 0.5 wt %, respectively, in a left-to-right direction).

As shown in FIG. 4, the upper unsettled phase was an isotropic phase in which graphene oxides were randomly dispersed without aligned in any direction, whereas, in the lower settled phase, graphene oxides were aligned with each other, suggesting that the graphene oxide had liquid crystalline properties. The liquid crystal phase observed herein showed mottled patterns which were schlieren textures of nematic liquid crystals.

Figure 5:
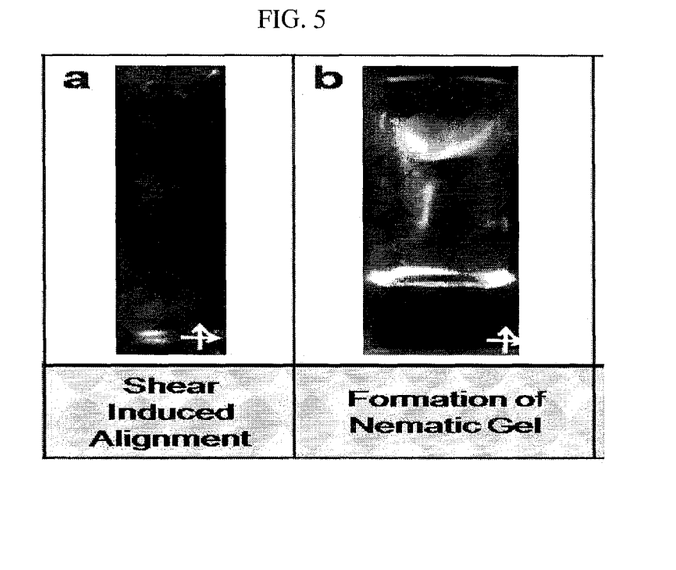
FIG. 5 shows polarized micrograph of a graphene oxide composition having liquid crystalline properties according to the present invention ((a): a 0.001 wt % concentration graphene oxide composition prepared using graphite flake (Sigma Aldrich), and (b): a 2.0 wt % concentration graphene oxide composition prepared using graphite flake (Sigma Aldrich).

Also, in the graphene oxide composition having a graphene oxide concentration of less than 0.05 wt %, the phase, which was settled with the passage of time and passed light to appear bright, was not observed. It could be found that light was passed through the graphene oxide composition between the perpendicularly crossed polarizers because the shear-induced alignment which occurred when shaking the graphene oxide composition (FIG. 5a). Also, as the graphene oxide concentration of the composition was gradually increased, the viscosity of the composition was gradually increased and the composition became a gel state at a graphene oxide concentration of about ~2 wt %. When the gel-state graphene oxide composition was interposed between two perpendicularly crossed polarizers and observed, light was passed through the composition, suggesting that the composition was a nematic gel (FIG. 5b).

Figure 6:
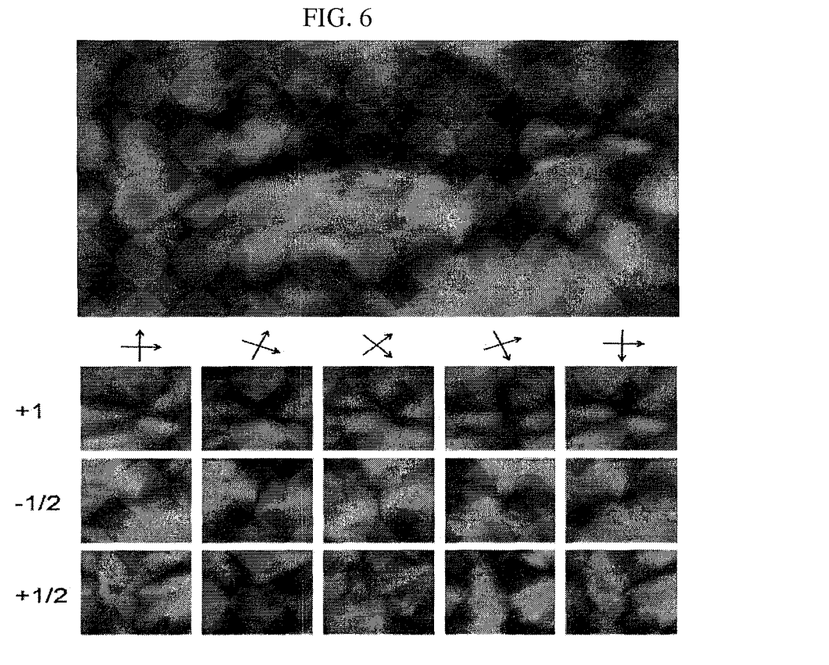
FIG. 6 is a polarized micrograph showing the disclination morphologies of a 0.3 wt % concentration graphene oxide composition prepared using natural graphite (Graphit Kropfmuhl) according to the present invention.

Meanwhile, as shown in FIG. 6, a dispersion of graphene oxide was placed and sealed between a cover glass and a slide glass, and then observed using a polarized optical microscope (Leitz-Labolux 12 Pol S). As a result, a thread like schlieren texture that is the typical feature of nematic liquid crystals appeared, and typical disclinations of +½, -½, +1 and -1 could be observed. The lower figure of FIG. 6 shows the direction in which brushes rotated when the perpendicularly crossed polarizers were rotated, and the sign of "s" could be determined by this direction. As shown therein, in the case of a disclination of ±1, four brushes rotated at the same rate as the rate at which the perpendicularly crossed polarizers were rotated. In the case of a disclination of ±½, two brushes rotated at a rate two times the rate at which the polarizers were rotated. Herein, in the case of +, the brushes rotated as the direction of rotation of the polarizers, and in the case of -, the brushes rotated in the direction opposite to the direction of rotation of the polarizers.

Test Example 2

Measurement of Orientation of Graphene Composition

Figure 7:
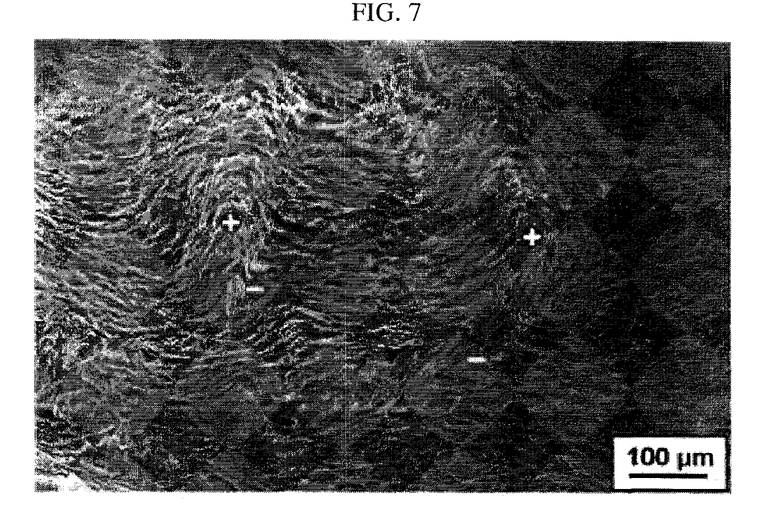
FIG. 7 is a SEM image showing freeze-dried disclination morphologies of a 0.5 wt % concentration graphene oxide composition prepared using natural graphite (Graphit Kropfmuhl) according to the present invention.

The graphene oxide composition prepared in Example 1-2 was freeze-dried to align the graphene oxide sheets. The microstructure of the aligned graphene oxide sheets was measured using a scanning electron microscope (SEM; S4800, Hitachi). The measurement results are shown in FIG. 7. As can be seen therein, the cooperative alignment of the graphene oxide sheets was observed, and disclinations of +½ and -½ remained relatively intact.

Figure 8:
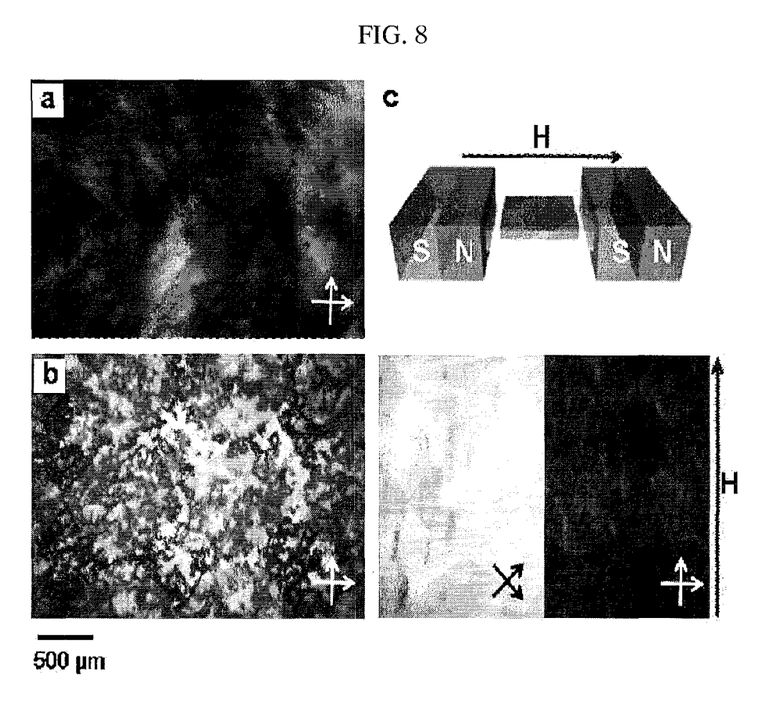
FIG. 8 shows polarized micrograph of a liquid crystalline graphene oxide composition having a graphene oxide concentration of 0.3 wt %, which was prepared from natural graphite (Graphit Kropfmuhl) and oriented by a magnetic field ((a): an image of as-made graphene oxide composition, (b): an image of a graphene oxide composition exhibiting a nematic schlieren texture after allowing to stand at room temperature for 3 hours, and (c): a schematic diagram showing a test for imparting magnetic properties, and an image of a graphene oxide composition imparted with magnetic properties).

When a magnetic field of 0.25 T was applied to the graphene oxide composition, it was observed that defects which had each orientation gradually disappeared and the graphene oxides were aligned in the direction in which the magnetic field was applied (FIG. 8).

Test Example 3

Measurement of Liquid Crystalline Properties and Orientation of Liquid Crystal Nanocomposite Material It was shown that the liquid crystal nanocomposite material prepared in Example 2 also exhibited a stable liquid crystal phase. In addition, when a magnetic field of 0.25 T was applied to the nanocomposite material, it was observed that the graphene oxides were aligned within 5 seconds in the direction in which the magnetic field was applied.

Test Example 4

Figure 9:
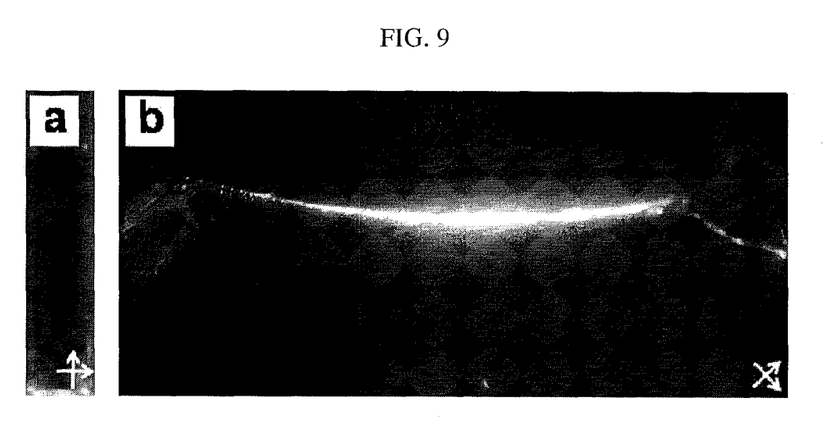
FIG. 9 shows polarized micrograph of a liquid crystal polymer nanocomposite comprising natural graphite (Graphit Kropfmuhl) and PAA according to the present invention ((a): an image of a liquid crystal polymer nanocomposite, and (b): an image of a hand-drawn sample of the liquid crystal polymer nanocomposite).

Measurement of Liquid Crystalline Properties and Orientation of Liquid Crystal Polymer Nanocomposite Material As shown in FIG. 9a, the liquid crystal polymer nanocomposite material prepared in Example 3 did not agglomerate and was stably dispersed, suggesting that it maintained a liquid crystal phase. In order to make a hand-drawn sample of the liquid crystal polymer nanocomposite material, about 10 g of water was evaporated from the liquid crystal polymer nanocomposite material, and then the nanocomposite material was drawn by hand into a fibrous form. It was observed that strong light was passed through the sample positioned in the direction of 45° with the drawing direction between perpendicularly crossed polarizers. This indicates that the graphene oxides were aligned in the drawing direction and macroscopically exhibited a strong optical anisotropy (FIG. 9b).

In addition, the liquid crystalline graphene oxide nanocomposite material drawn by hand into a fibrous form was freeze-dried in liquid nitrogen. The freeze-dried graphene oxide nanocomposite material was cut in the directions perpendicular and parallel to the drawing axis, and the cross-section thereof was observed with a scanning electron microscope (SEM).

Figure 10:
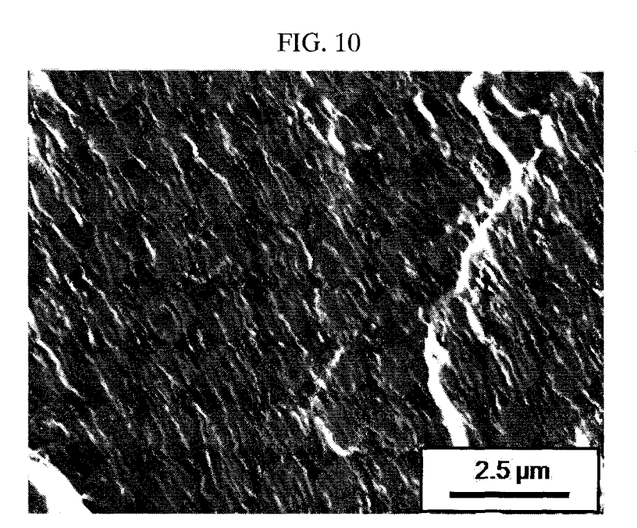
FIG. 10 is an SEM image of the cross-section of a freeze-dried liquid crystal polymer nanocomposite according to the present invention.

As a result, as shown in FIG. 10, graphene oxides having collective orientation were observed in the cross-section of the nanocomposite material.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A graphene composition having liquid crystalline properties, which comprises 0.001 to 20 parts by weight of graphene based on 100 parts by weight of a medium, wherein an aspect ratio of the graphene is 30 to 500,000.

2. The graphene composition having liquid crystalline properties according to claim 1, wherein the graphene is selected from a group consisting of graphite, single layer graphene, multilayer graphene, graphene oxidation product, graphite oxidation product, functionalized graphene, functionalized graphite, graphene reduction product, graphite reduction product and mixtures thereof.

3. The graphene composition having liquid crystalline properties according to claim 1, wherein the medium is selected from a group consisting of a flowable solid, semi-solid, liquid and mixture thereof.

4. A method for preparing a graphene composition having liquid crystalline properties, comprising a step of preparing a dispersion by dispersing 0.05 to 20 parts by weight of graphene in 100 parts by weight of a medium, wherein an aspect ratio of the graphene is 30 to 500,000.

5. The method according to claim 4, wherein the medium is selected from a group consisting of a flowable solid, semi-solid, liquid and mixture thereof.

6. The method according to claim 4, wherein the graphene is selected from a group consisting of graphite, single layer graphene, multilayer graphene, graphene oxidation product, graphite oxidation product, functionalized graphene, functionalized graphite, graphene reduction product, graphite reduction product and mixtures thereof.

7. The method according to claim 4, wherein dispersing the graphene in the medium is achieved by a method selected from a group consisting of sonication, mechanical stirring and a combination thereof.

8. The method according to claim 4, further comprising a step of performing dialysis or centrifugation for removing from said composition having liquid crystalline properties impurities comprising graphene dispersed in the medium.

9. A liquid crystal nanocomposite comprising an electromagnetic material and the graphene composition having liquid crystalline properties of claim 1.

10. The liquid crystal nanocomposite according to claim 9, wherein the electromagnetic material is selected from a group consisting of a magnetic material, a conductive material and mixture thereof.

11. The liquid crystal nanocomposite according to claim 9, wherein the liquid crystal nanocomposite comprising 0.001 to 95 parts by weight of the electromagnetic material based on 100 parts by weight of the graphene composition having liquid crystalline properties.

12. The liquid crystal nanocomposite according to claim 9, further comprising a coupling agent for improving the ability to couple the electromagnetic material with the graphene composition.

13. The liquid crystal nanocomposite according to claim 12, wherein the coupling agent is selected from a group consisting of 1,3-dicyclohexylcarbodiimide, 1-ethyl-3(3-dimethylaminopropyl)-carbodiimide, benzotriazol-1-yloxy-tris(dimethylamino)phosphonium hexafluorophosphate, O-(7-azabenzotriazol-1-yl)-N,N,N',N'-tetramethyluronium hexafluorophosphate and mixtures thereof.

14. A liquid crystal polymer nanocomposite comprising a polymer and the graphene composition having liquid crystalline properties of claim 1.

15. The liquid crystal polymer nanocomposite according to claim 14, wherein the polymer is selected from a group consisting of polyacrylic acid (PAA), polyethyleneoxide (PEO), polystyrene, polymethylmethacrylate, polycarbonate, polyethylene, polypropylene, polyacrylonitrile, polyvinylpyrrolidone, polydimethylsiloxane, poly(styrene-block-ethyleneoxide), poly(styrene-block-dimethylsiloxane), poly(styrene-block-methylmethacrylate), deoxyribonucleic acid (DNA), lipid, peptide, poly(acetylene)s, poly(pyrrole)s, poly(thiophene)s, polyanilines, polythiophenes, poly(p-phenylenesulfide), poly(p-phenylenevinylene)s, liquid-crystal polymers and mixtures thereof.

16. The liquid crystal polymer nanocomposite according to claim 14, comprising 10 to 95 parts by weight of the polymer based on 100 parts by weight of the graphene composition having liquid crystalline properties.

* * * * *